United States Patent
Herman (10) Patent No.: US 6,939,628 B2
(45) Date of Patent: Sep. 6, 2005

(54) METHOD AND APPARATUS FOR INCREASING FUEL CELL EFFICIENCY, POWER OUTPUT, OR REDUCED-TEMPERATURE OPERATION

(75) Inventor: Gregory Herman, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 346 days.

(21) Appl. No.: 10/202,079

(22) Filed: Jul. 23, 2002

(65) Prior Publication Data

US 2004/0018400 A1 Jan. 29, 2004

(51) Int. Cl.$^7$ .......................... H01M 8/00; H01M 8/04; H01M 8/12; H01M 4/86
(52) U.S. Cl. ....................... 429/10; 429/30; 429/40
(58) Field of Search ................... 429/10, 13, 30, 429/31, 33, 40

(56) References Cited

U.S. PATENT DOCUMENTS

| | | | | |
|---|---|---|---|---|
| 3,493,436 A | * | 2/1970 | Johnsen ..................... | 429/10 |
| 4,495,040 A | | 1/1985 | Panico | |
| 5,728,482 A | * | 3/1998 | Kawakami et al. ........... | 429/10 |
| 5,928,804 A | * | 7/1999 | Leddy et al. ................. | 429/10 |
| 6,511,766 B1 | * | 1/2003 | Loutfy et al. ................. | 429/34 |
| 2004/0033411 A1 | * | 2/2004 | Lersch et al. ................. | 429/34 |

FOREIGN PATENT DOCUMENTS

| | | | | | |
|---|---|---|---|---|---|
| EP | 156482 A | * | 10/1985 | ............. | C22C/1/04 |
| JP | 61091876 A | * | 5/1986 | ............. | H01M/8/04 |
| JP | 2001155746 A | * | 6/2001 | ............. | H01M/8/02 |
| JP | 2001229931 A | * | 8/2001 | ............. | H01M/8/02 |
| JP | 2002198057 A | * | 7/2002 | ............. | H01M/4/86 |

OTHER PUBLICATIONS

Machine Translation of JP 2001–155746–A.*
Machine Translation of JP 2001–229931–A.*
Blomen et al. "Fuell Cell System", Plenum Press, 1993, pp. 486–488.*
Okada et al. "The effect of magnetic field on the oxygen reduction reaction and its application in polymer electrolyte fuel cells", Electrochimica Acta 48, 2003, pp. 531–539.*
Effects of Magnetic Field on Catalytic Activity of CO Oxidation and O2 Adsorption Over $Ln_{0.7}Sr_{0.3}MnO_3$, Journal of Physical Chemistry, vol. 97, No. 8, Feb., 1993, pp. 1471–1473.
Water—Solid Interactions Under Steady Magnetic Fields: Magnetic–Field–Induced Adsorption and Desorption of Water, Journal of Physical Chemistry, vol. 100, No. 10, 1996, pp. 4205–4212.
Microscale Confinement of Paramagnetic Molecules in Magnetic Field Gradients Surrounding Ferromagnetic Microclectodes, Journal of Physical Chemistry, vol. 105, No. 37, 2001, pp. 8989–8994.

* cited by examiner

*Primary Examiner*—Gregg Cantelmo (57) ABSTRACT

The present invention provides a method of increasing fuel cell efficiency, power output, or reduced-temperature operation by directing an external magnetic field to a fuel cell cathode.

26 Claims, 7 Drawing Sheets

METHOD AND APPARATUS FOR INCREASING FUEL CELL EFFICIENCY, POWER OUTPUT, OR REDUCED-TEMPERATURE OPERATION

FIELD OF THE INVENTION

The present invention relates to fuel cells. More particularly, the present invention relates to methods and apparatus for increasing fuel cell efficiency, power output, or reduced-temperature operation.

BACKGROUND OF THE INVENTION

Over the past century the demand for energy has grown exponentially. With the growing demand for energy, many different energy sources have been explored and developed. One of the primary sources for energy has been and continues to be the combustion of hydrocarbons. However, the combustion of hydrocarbons usually results in incomplete combustion and non-combustibles that contribute to smog and other pollutants in varying amounts.

As a result of the pollutants created by the combustion of hydrocarbons, the desire for cleaner energy sources has increased in more recent years. With the increased interest in cleaner energy sources, fuel cells have become more popular and more sophisticated. Research and development on fuel cells has continued to the point that many speculate that fuel cells will soon compete with the gas turbine for generating large amounts of electricity for cities, the internal combustion engine for powering automobiles, and batteries that run a variety of small and large electronics.

Fuel cells conduct an electrochemical energy conversion of a fuel and an oxidizer into electricity and heat. Fuel cells are similar to batteries, but they can be "recharged" while providing power.

Figure 1:
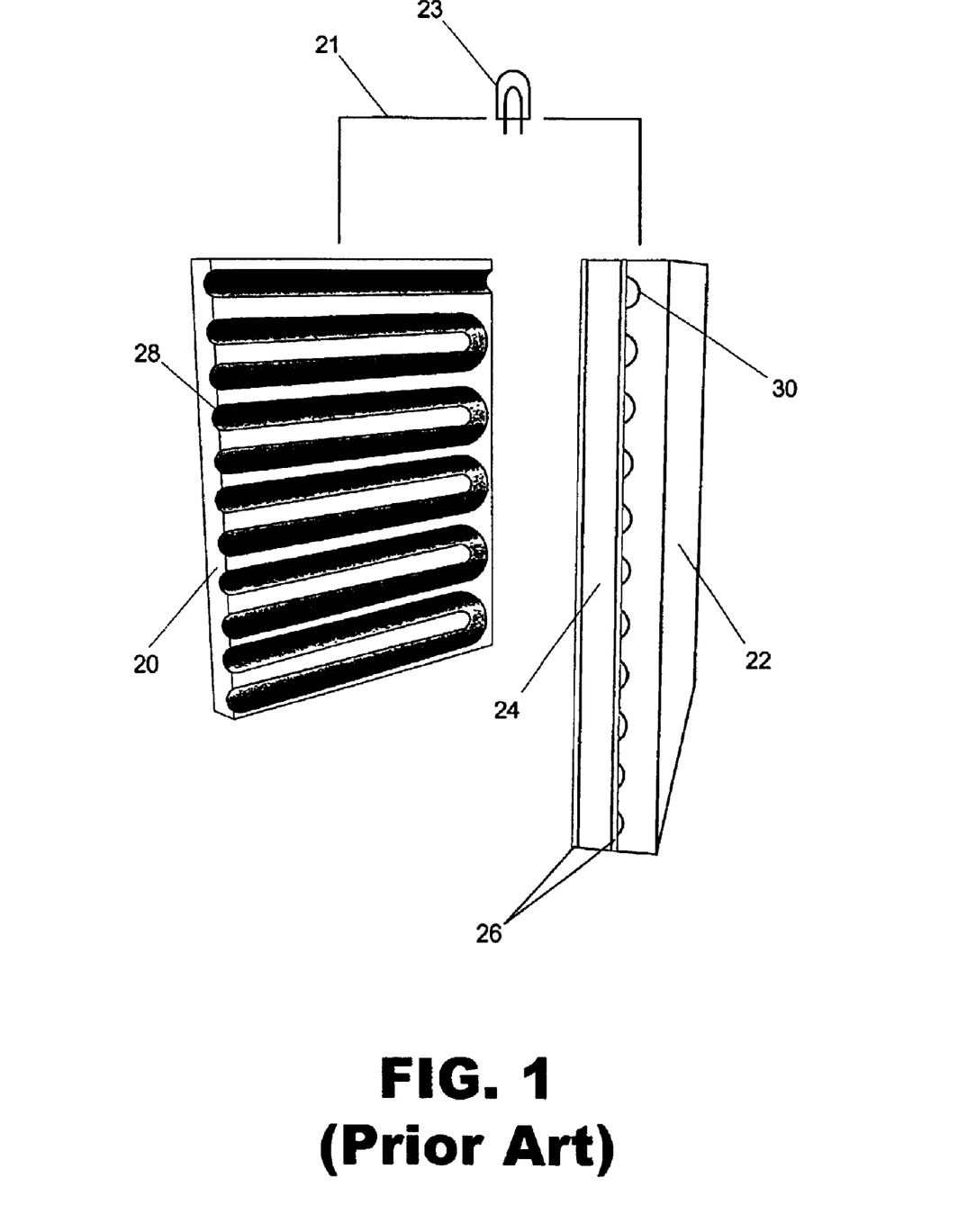
FIG. 1 is an unassembled perspective view of a solid oxide fuel cell apparatus.

Fuel cells provide a direct current (DC) voltage that may be used to power motors, lights, or any number of electrical appliances. There are several different types of fuel cells, each using a different chemistry. Fuel cells are usually classified by the type of electrolyte used. The fuel cell types are generally categorized into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).
Solid Oxide Fuel Cells The SOFCs are currently believed to be a very promising fuel cell technology, and allow the use of a variety of fuels (e.g., hydrogen, hydrocarbons, alcohols, etc.). Referring to FIG. 1, a SOFC will typically include four basic elements: an anode (20), a cathode (22), an electrolyte (24), and bipolar plates (26) arranged on each side of the electrolyte (24) in contact with the respective anode (20) or cathode (22).

The bipolar plate (26) in contact with the anode (20) is the negative post of the fuel cell and conducts electrons that are freed from the fuel such that the electrons can be used in an external circuit (21). The bipolar plate (26) includes channels (28) etched therein to disperse the fuel as evenly as possible over the surface of the anode (20), and remove any fuel products from the fuel anode reaction (e.g., water, carbon dioxide, etc.).

The bipolar plate (26) in contact with the cathode (22) is the positive post of the fuel cell, and has channels (30) etched therein to evenly distribute oxygen (usually air) to the surface of the cathode (22), and provide for the removal of oxygen depleted air. The cathode (22) also conducts the electrons back from the external circuit to the catalyst, where they combine with molecular oxygen to form oxygen ions.

The electrolyte (24) is a solid oxide membrane (24). The membrane (24) is typically a high temperature ceramic material that conducts only oxygen ions. This membrane (24) also prevents the passage of electrons.

The anode (20) is typically a ceramic/metal mixture (cermet) (e.g., yttria stabilized zirconia/nickel, samaria doped ceria/nickel, etc.). The anode (20) is usually porous so as to maximize the three-phase boundary. The anode (20) facilitates the oxidation of the fuel.

The cathode (22) is typically a composite mixture of the electrocatalyst and oxygen ion conductor (e.g., lanthanum strontium maganate/yttria stabilized zirconia, samarium strontium cobaltite/samaria doped ceria, etc.). The cathode (22) is usually porous so as to maximize the three-phase boundary. The cathode (22) facilitates the reduction of the oxidant.

In a working fuel cell, the solid oxide membrane (24) is sandwiched between the anode (20) and the cathode (22). The operation of the fuel cell can be described generally as follows. The fuel (e.g., hydrocarbon, $H_2$, carbon monoxide, etc.) enters the fuel cell on the anode (20) side. When the fuel comes into contact with the catalyst on the anode (26), ions and electrons are formed, where for the case of an $H_2$ molecule two $H^+$ ions and two electrons ($e^-$) are formed. The electrons are conducted through the anode (20) to the bipolar plate (26), where they make their way through the external circuit (21) that may be providing power to do useful work (such as turning a motor or lighting a bulb (23)) and return to the cathode side of the fuel cell.

Meanwhile, on the cathode (22) side of the fuel cell, molecular oxygen ($O_2$) is present in air and is flowing through the catalyst (26). As $O_2$ is forced through the catalyst (26), it forms two oxygen ions, each having a strong negative charge. These oxygen ions pass through the solid oxide electrolyte and interact with the fuel on the anode. In the case of $H_2$ as the fuel, the oxygen ions combine to form a water molecule and two electrons for the external circuit.

The fuel cell reaction just described produces only about 0.7 volts at a useful current, therefore, to raise the voltage to a higher level, many separate fuel cells are often combined to form a fuel cell stack.

Solid oxide fuel cells typically operate at fairly high temperatures (above approximately 800° C.), which allow them to have high reaction kinetics, and use a variety of fuels depending on the anode composition. Lower temperature operation is desired for applications that require rapid startup, where inexpensive containment structures, and temperature management is of concern.

The reaction rate for the dissociation and ionization of molecular $O_2$, normally provided by ambient air, and the transport of these ions to the electrolyte limits the power of the cell especially when operating temperatures are reduced (<600° C.). This phenomena (insufficient availability of oxygen ions present at the cathode/electrolyte interface) in part causes the cathode overpotential and it limits the performance of fuel cells even with the use of advanced materials such as doped cobaltites, manganites, and ferrites, when operated at low temperatures. Two methods can be used to limit this effect. One method is to provide pure oxygen to the cathode (22) to ensure a sufficient supply of $O_2$ is always present to maximize the reaction rate and thus the electricity produced. The second method is to run the cell at higher operating temperatures to increase the oxygen dissociation kinetics and ion transport. However, a pure supply of $O_2$ adds to the expense of the fuel cell operation and may even render the operation of the fuel cell inefficient and/or uneconomical if a pure supply of $O_2$ is necessary to facilitate the reaction. Also, operating at higher temperatures may limit the packaging options and add to the cost of the system.

SUMMARY OF THE INVENTION

The present invention meets the above-described needs and others. Specifically, the present invention provides a method of increasing fuel cell efficiency or power output by directing an external magnetic field to a fuel cell cathode.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The foregoing and other features and aspects of the invention will become further apparent upon reading the following detailed description and upon reference to the drawings in which.

In the drawings, identical reference numbers indicate similar, but not necessarily identical, elements. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. As will be appreciated by those skilled in the art, the present invention can be implemented in a wide variety of fuel cell applications. The fuel cell applications include, but are not limited to, SOFC, PEM fuel cells, AFCs, PAFCs, and MCFCs.

Figure 2:
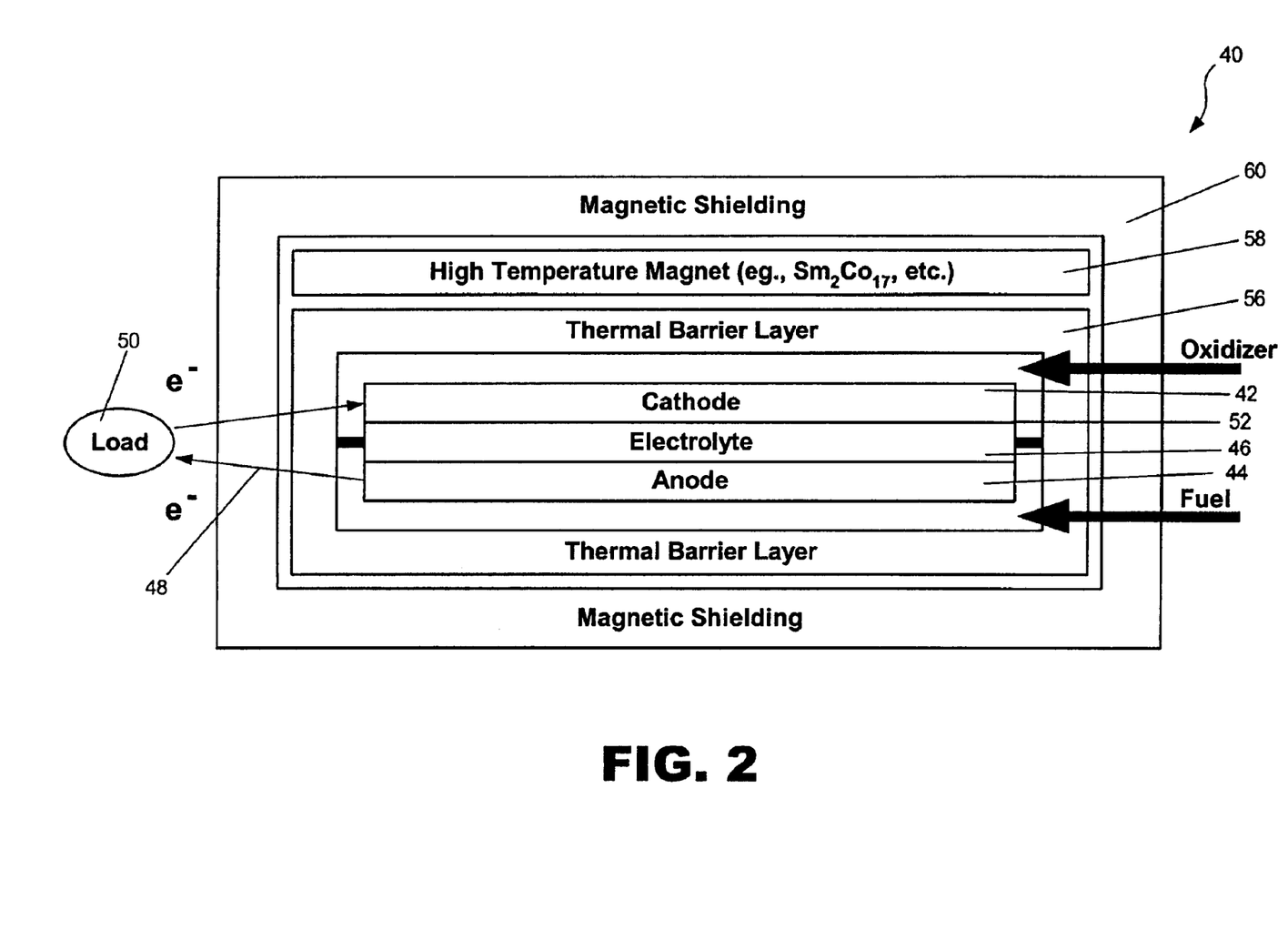
FIG. 2 is a diagrammatical illustration of a fuel cell with a magnetic field generator according to one embodiment of the present invention.

Turning now to the figures, and in particular to FIG. 2, a fuel cell apparatus (40) according to one embodiment of the present invention is shown. As with many fuel cells, fuel cell apparatus (40) includes a cathode (42), an anode (44), and an electrolyte (46) disposed between the cathode (42) and the anode (44). An electrical circuit (48) is arranged between the cathode (42) and the anode (44) and may include an electrical load (50), which is representative of an electrically-powered device of any kind. Electrical load (50) is not necessary to the present invention, however, and may be inserted and withdrawn at will from electrical circuit (48).

The electrolyte (46) of the fuel cell apparatus (40) may be any of a number of electrolytes discussed above, and is preferably a solid oxide electrolyte. Catalytic surfaces are located throughout the cathode (42) and anode (44) and facilitates the chemical reaction described above to generate an electrical current in the electrical circuit (48). According to the embodiment of FIG. 2, the cathode (42), anode (44), and electrolyte (46) may be housed in a thermal barrier (56). The thermal barrier (56) may include aerogels, ceramics, composites, polymers, or other porous superinsulators other materials. The thermal barrier (56) reduces or prevents the transfer of heat generated by the fuel cell chemical reactions to a magnetic field generator such as permanent magnet (58) or other device for generating a magnetic field.

According to the embodiment of FIG. 2, the permanent magnet (58) is located in proximity to the cathode (42) for creating a magnetic field directed to the cathode (42). As used in this disclosure, an "external" magnetic field is a magnetic field generated by other than the earth's normal magnetic field. In embodiments where the permanent magnet (58) is separated from the cathode (42), the thermal barrier (56) material should be selected such that no magnetic interference to the magnetic field is created. It will be appreciated, however, that in some embodiments there may be no thermal barrier (56) and the permanent magnet (58) may be directly adjacent to the cathode (42). To facilitate the creation of a magnetic field with the cathode (42), the cathode (42) may include magnetic materials such as doped cobaltites, manganites, ferrites, or other magnetic materials.

In some embodiments where the potential for elevated temperatures of the fuel cell (40) is a possibility even with the addition of the thermal barrier (56), high temperature magnets may be used. Ferromagnetic materials heated above a certain temperature, known as the Curie Temperature or Curie point, completely lose their ferromagnetic behavior. For example, the Curie temperature for neodymium magnets (NdFeB) is roughly 310° C. However, magnetic properties of a material can change for temperatures well below the Curie temperature. Neodymium magnets, for example, begin to lose their magnetization at temperatures as low as 148° C. High temperature magnets, on the other hand, retain their magnetic properties to significantly higher temperatures.

Therefore, permanent magnet (58) may be a high temperature magnet such as a samarium cobalt ($Sm_2Co_{17}$) magnet. Samarian cobalt (and neodymium iron boron) is an alloy of the Lanthanide group of elements. Samarium cobalt magnets are available in a number of different grades that span a wide range of properties and application requirements. Rare earth magnets such as samarium cobalt and neodymium iron boron magnets are available commercially from a variety of sources. Advantageously, samarium cobalt magnets are operable at temperatures up to 350° C., depending upon the grade and permeance coefficient. The thermal barrier (56) prevents or reduces the chance that the permanent magnet (58) reaches a temperature at which magnetic properties of the magnet are affected.

A magnetic shielding (60) may house the fuel cell apparatus (40) to prevent outside magnetic fields from affecting the magnetic field created by the permanent magnet (58) and the cathode (42). The magnetic shielding (60) may include mumetal, permalloy, alloy 4750, etc. that are commercially available from many sources.

The permanent magnet (58) is sized and positioned to focus a magnetic field at the catalytic surface (52) between the cathode (42) and the electrolyte (46). As discussed above, an air source is provided to the cathode (42) for supplying oxygen ions to pass through the electrolyte (46). The combining of $H^+$ ions at the anode with oxygen ions can sometimes be limited by the dissociation activity of oxygen molecules at the catalytic surface (52) (which is related to the cathode overpotential). Therefore, according to the present invention, a magnetic field is focused at or near the catalytic surface (52) to enhance catalytic activity at the surface, desorb/adsorb active or inactive species, and/or to increase the concentration of oxygen at the catalytic surface (52) (for a heterogeneous catalyst in a magnetic field see for example P.-Y. Lin et al., J. Phys. Chem. 97 (1993) 1471; for the adsorption/desorption of molecules using magnetic fields see S. Ozeki et al. J. Phys. Chem. 100 (1996) 4205, and for the confinement of molecules in magnetic fields see M. D. Pullins et al., J. Phys. Chem. B 105 (2001) 8989; each of which are hereby incorporated by reference).

Focusing a magnetic field at the catalytic surface (52) increases oxygen concentration from an air source because oxygen is a paramagnetic molecule. "Paramagnetic" means that an atom or molecule is attracted to a magnetic field, or is "magnetically susceptible." Magnetic susceptibility is a measure of the intensity of the magnetization of a substance when it is placed in a magnetic field. Oxygen has an exceptionally high magnetic susceptibility compared to other gases—several hundred times greater than that of most other gases, including nitrogen. Oxygen is paramagnetic because it has two electrons in unpaired orbits.

Nitrogen, on the other hand, is like most other gases in that it is diamagnetic. Diamagnetic molecules are repelled from, rather than attracted to, magnetic fields. Therefore, by focusing an external magnetic field, such as the magnetic field generated by the permanent magnet (58), the concentration of oxygen at the focus is increased by attracting the oxygen molecules and repelling the nitrogen (and other gas) molecules. As discussed above, increasing the concentration of oxygen molecules at the catalytic surface (52) and reducing the concentration of inert molecules (e.g., nitrogen) advantageously increases the efficiency of a fuel cell by reducing the cathode overpotential. That is to say, more oxygen anions will be created at the cathode when the concentration of oxygen molecules is increased beyond normal ambient conditions.

Figure 3A:
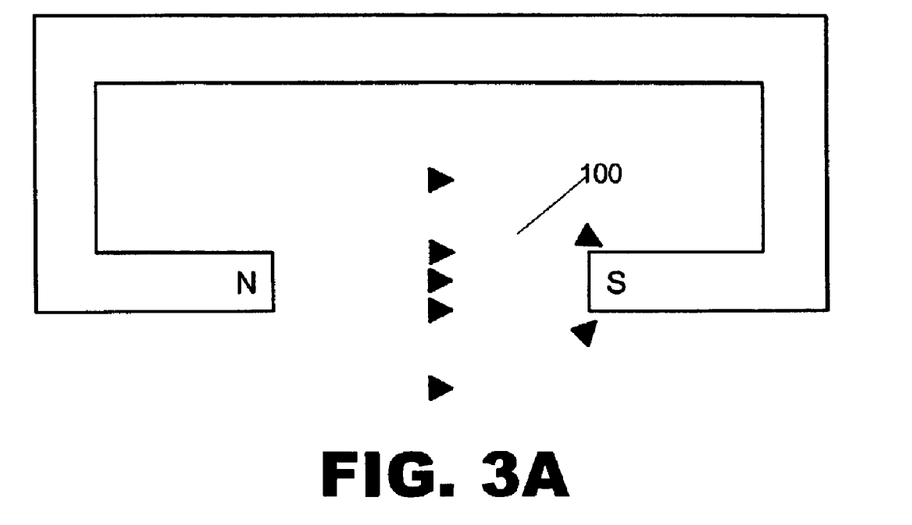
FIG. 3A is a diagrammatical illustration of paramagnetic molecule location in the presence of a magnetic field according to one embodiment of the present invention.
Figure 3B:
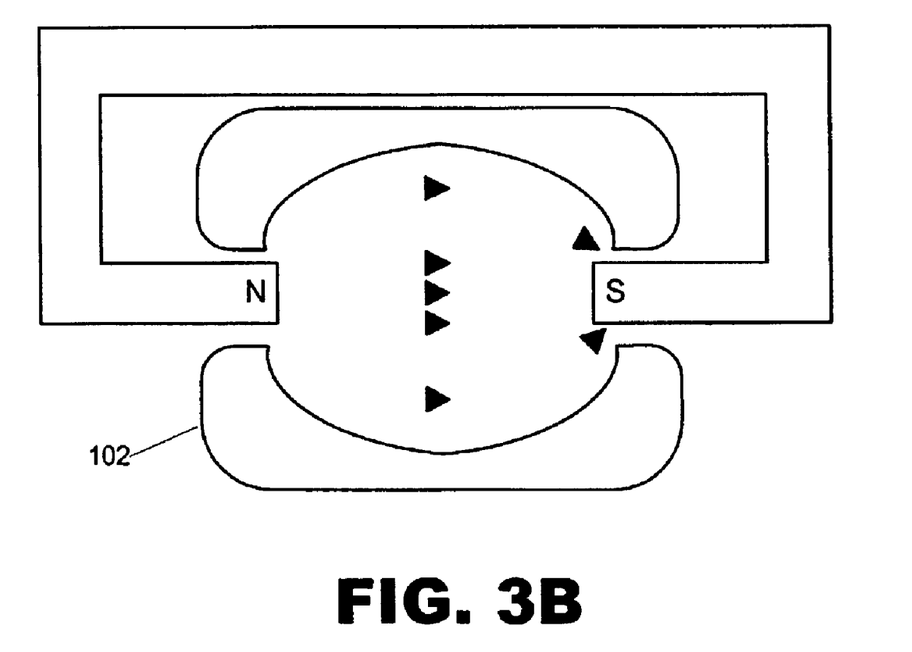
FIG. 3B is a diagrammatical illustration of a diamagnetic molecule location in the presence of a magnetic field according to one embodiment of the present invention.

Referring to FIGS. 3A and 3B, the general location of paramagnetic (100) and diamagnetic (102) molecules are shown in the presence of a magnetic field. Paramagnetic molecules (100) include oxygen, and diamagnetic molecules include nitrogen. Accordingly, one of skill in the art having the benefit of this disclosure can see that a magnetic field may be used as described above to increase the concentration of oxygen at the catalytic surface (52) from a supply of ordinary air.

Figure 4:
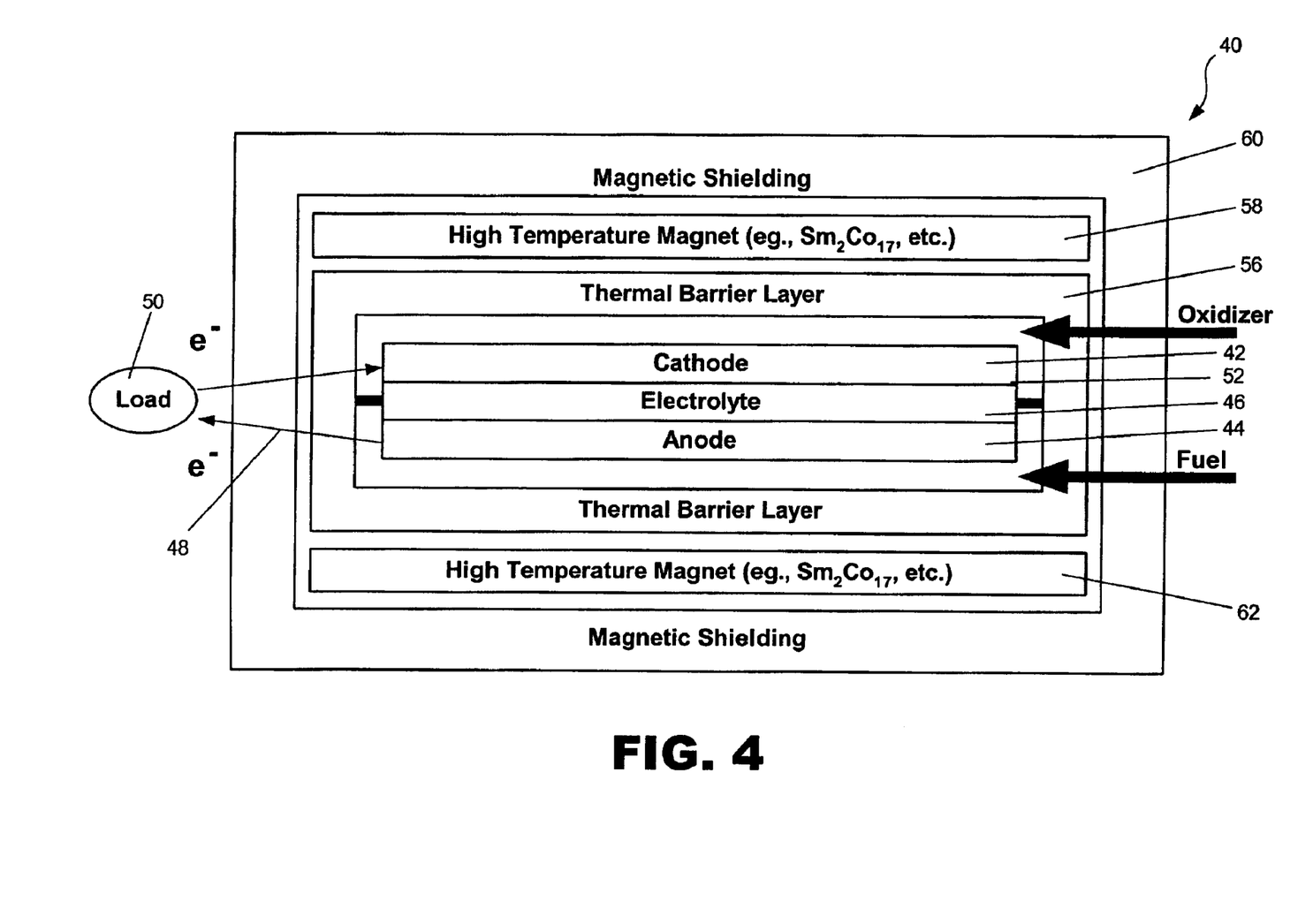
FIG. 4 is a diagrammatical illustration of a fuel cell with a magnetic field generator according to another embodiment of the present invention.

Turning next to FIG. 4, another embodiment of the present invention is disclosed. According to the embodiment of FIG. 4, there is more than one permanent magnet included in the fuel cell apparatus (40). As shown in FIG. 4, a second permanent magnet (62) located in proximity to the anode (44) is included. Second permanent magnet (62) is situated to help focus a magnetic field to the catalytic surface (52) of cathode (42), or to increase the intensity of the magnetic field. As with the first permanent magnet (58), the second permanent magnet (62) may be a high temperature magnet made of samarium cobalt or other materials. The first and second permanent magnets (58 and 62) may be similar or identical to one another in shape and material as shown, but this is not necessarily so. The first and second magnets (58 and 62) may also be dissimilar in form and material. Further, similar to the arrangement of the first permanent magnet (58) to the cathode (42), the second permanent magnet (62) may be separated from the anode (44) by the thermal barrier (56). However, in some embodiments, the second permanent magnet (62) may be disposed directly adjacent to the anode (44).

The addition of the second permanent magnet (62) may add to the intensity of the magnetic field created by first magnet (58) to increase the oxygen concentration at the cathode (42), increase the kinetics of molecular oxygen dissociation and enhance the efficiency of the fuel cell apparatus (40). The second permanent magnet (62) is shown in the present embodiment opposite of first magnet (58), but this is not necessarily so. The second permanent magnet (62) may be otherwise situated as desired to manipulate and control the focus and intensity of the magnetic field generated.

Figure 5:
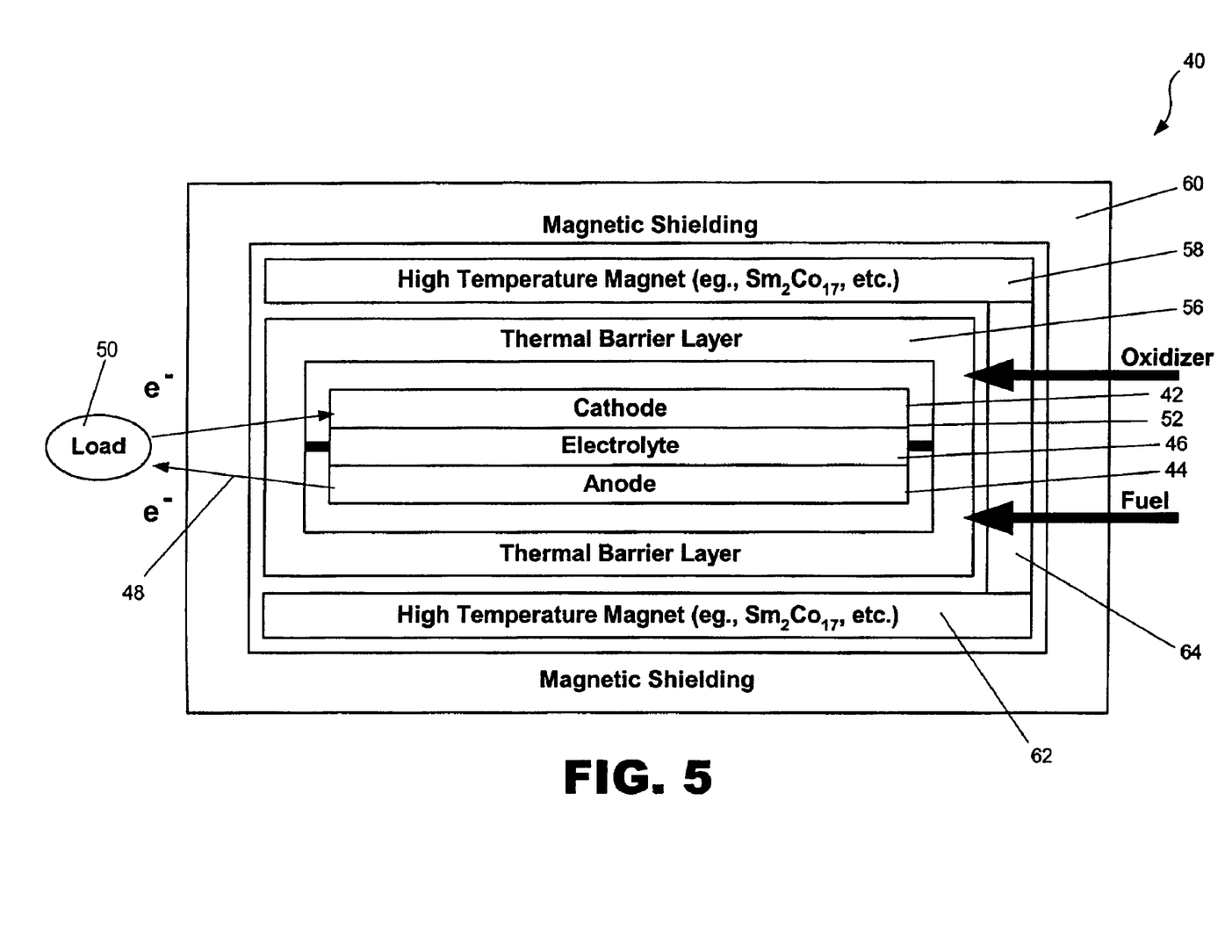
FIG. 5 is a diagrammatical illustration of a fuel cell with a magnetic field generator according to another embodiment of the present invention.

Referring next to FIG. 5, another embodiment of the present invention is shown. According to the embodiment of FIG. 5, a third permanent magnet (64) is arranged across the interface between the anode (44) and the cathode (42). Third permanent magnet (64) is situated to help focus a magnetic field to the catalytic surface (52) of cathode (42). As with the first and second permanent magnets (58 and 62), the third permanent magnet (64) may be a high temperature magnet made of samarium cobalt or other materials. The first, second, and third permanent magnets (58, 62, and 64) may be similar or identical to one another in shape and material as shown, but this is not necessarily so. The first, second, and third magnets (58, 62 and 64) may also be dissimilar in form and material. Further, similar to the arrangement of the first permanent magnet (58) to the cathode (42), the third permanent magnet (64) may be separated from the anode (44), cathode (42), and electrolyte (46) by the thermal barrier (56). However, in some embodiments, the third permanent magnet (64) may be disposed directly adjacent to the anode (44), cathode (42) and electrolyte (46).

The addition of the third permanent magnet (64) adds to the intensity and/or changes the shape of the magnetic field created by first and second magnets (58 and 62) to increase oxygen concentration at the cathode (42), increase the kinetics of molecular oxygen dissociation, and enhance the efficiency of the fuel cell apparatus (40). The third permanent magnet (64) is shown in the present embodiment spanning normally between first magnet (58) and second magnet (62), but this is not necessarily so. The third permanent magnet (64) may be otherwise situated as needed to manipulate and control the focus of the magnetic field generated. Alternatively, the first, second, and third magnets (58, 62, and 64) may be made of a single piece. Additional magnets may also be added.

It will be appreciated that in some embodiments the first, second, and/or third magnets (58, 62, and 64) may be replaced with electromagnets that are selectively operable. However, it is desirable that the power consumed by any such electromagnet(s) be less than the marginal increase in electrical production by the fuel cell as a result of the enhanced oxygen concentration. As discussed below, the introduction of electromagnets may be used to further enhance catalytic activity and not solely to increase oxygen concentration at the cathode (42).

Figure 6:
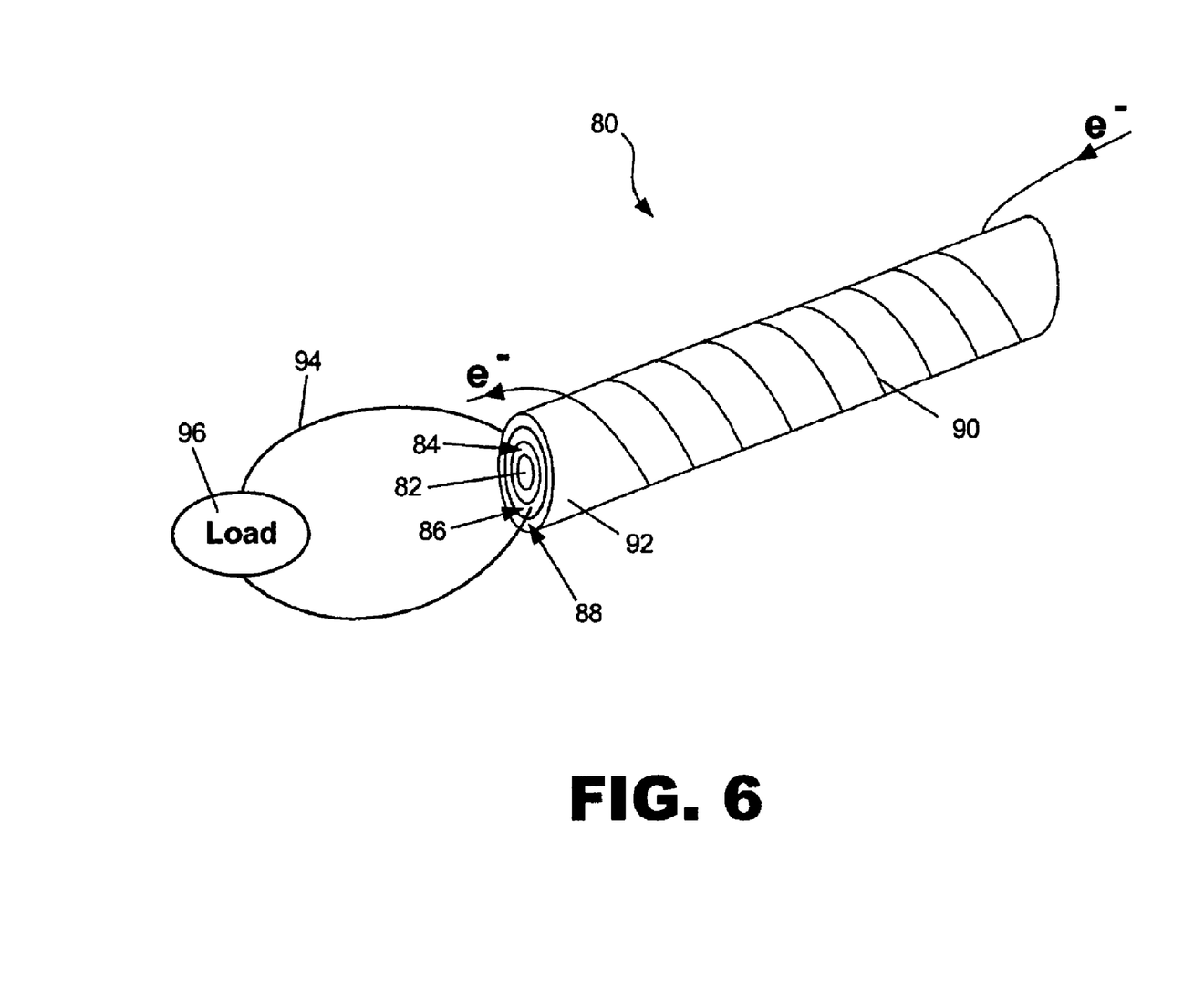
FIG. 6 is a perspective view of a fuel cell with a magnetic field generator according to another embodiment of the present invention.

Referring next to FIG. 6, another embodiment according to the present invention is shown. According to the embodiment of FIG. 6, there is a tubular fuel cell apparatus (80). The tubular fuel cell apparatus (80) includes an interior anode (84) arranged with a hollow interior region (82) that is receptive of a fuel source such as hydrogen gas. Concentrically arranged about the interior anode (84) is an electrolyte (86), which may be, for example, a solid oxide membrane. A cathode (88) is concentrically arranged about the electrolyte (86). The cathode (88) may be made of magnetic materials such as cobaltites, manganites, and ferrites and wrapped with a coil (90). A circuit (94) with or without a load (96) is connected between the anode (82) and the cathode (88). Coil (90) is a wiring adapted to carry an electrical current. When coil (90) does carry an electrical current, a magnetic field is created that can be directed or focused at a surface (92) of the cathode (88) that is surrounded by air to increase catalytic activity. Increased catalytic activity results in enhanced fuel cell efficiency.

The focus and intensity of the magnetic field created by the windings of coil (90) carrying a current may be controlled by a number of factors. The factors for controlling the magnetic field include, but are not limited to: adjusting the number of windings, adjusting the amount of current supplied to the coil (90), alternating the current supplied to the coil (90), changing the geometry of the cathode (88), etc. By applying an alternating current to the coil (90), an alternating magnetic field is created. It is believed that the magnetic and paramagnetic materials comprising the air (such as oxygen) and the catalyst between the electrolyte (86) and the cathode (88) attempt to constantly align themselves and the electron polarization with the alternating magnetic field, increasing the energy level of the material. When the energy level of the magnetic and paramagnetic materials increases, different electronic states may become available that increase the catalytic activity for the dissociation of oxygen molecules. Further, as the reaction rate at the cathode increases, the power generated by the fuel cell increases. Therefore, by applying an alternating magnetic field to the cathode, catalytic activity is increased and fuel cell efficiency improves.

Alternatively, the anode (84) and the cathode (88) may be rearranged in an opposite configuration with an interior cathode (88) and exterior anode (84). In such an embodiment, a flow of air may be directed through the hollow interior region (82) while the fuel source surrounds the surface (92) of the anode (84) (which in the alternative embodiment is in the place of the cathode (88)). The coil (90) may be supplied with a current to create a magnetic field at the interior hollow region (82) to increase the catalytic activity for the dissociation of oxygen molecules.

For fuel cell systems that operate at lower temperatures, PEM based systems for example, flooding of the cathode with water can occur. The application of a magnetic field can result in the desorption of water from the cathode area allowing oxygen molecules to more freely interact with the catalyst at the cathode and increase the performance of the fuel cells system.

Figure 7:
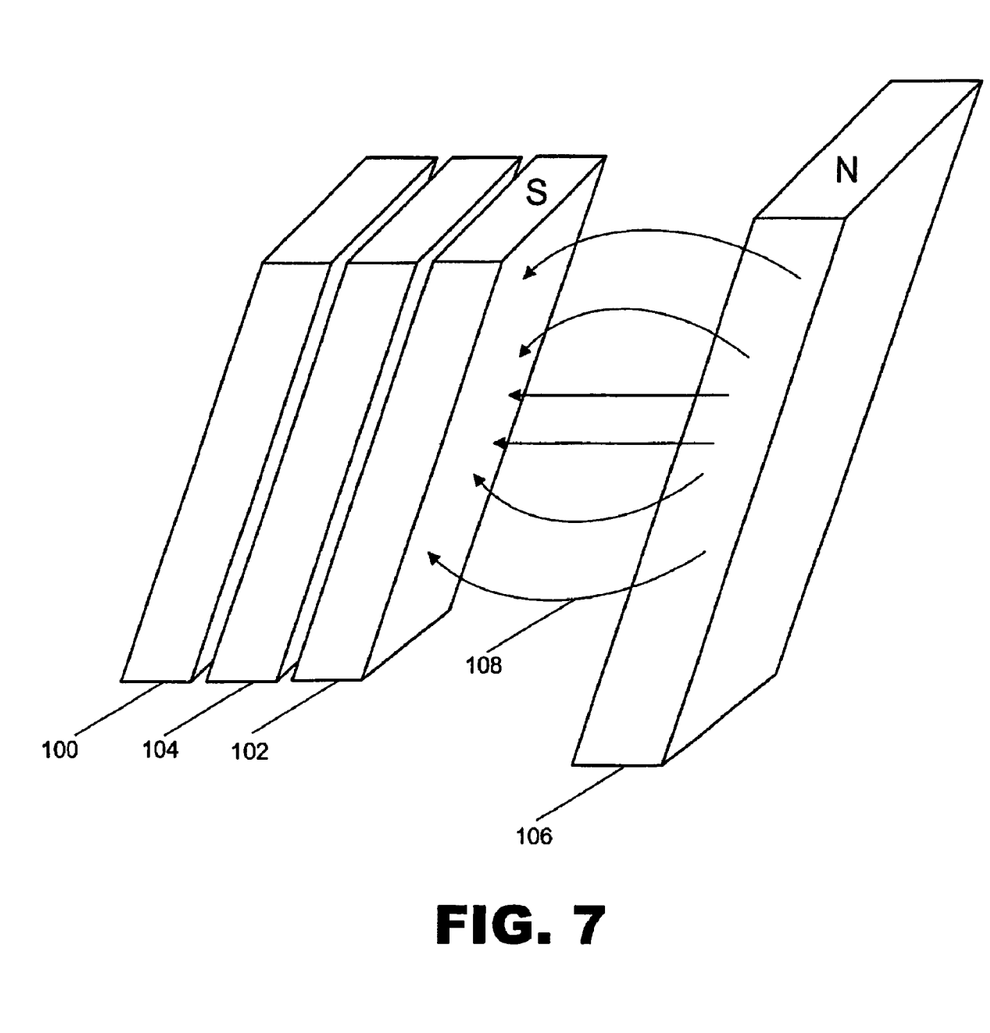
FIG. 7 is a perspective view of a fuel cell with a magnetic field generator according to another embodiment of the present invention.

Referring next to FIG. 7, another embodiment of a fuel cell system of the present invention is shown. According to the embodiment of FIG. 7, a fuel cell comprising an anode (100), a cathode (102), and an electrolyte (104) is arranged in close proximity to a single-pole magnet (106). The cathode (102) includes magnetic materials and forms a pole of a magnetic field represent by arrows (108). In the present embodiment, the cathode (102) is a South pole magnet, while the single pole magnet (106) is a North pole magnet. However, the North and South magnetic poles may also be reversed. The combination of the magnetic cathode (102) and the single-pole magnet (106) is a magnetic field generator for increasing catalytic activity for the dissociation of oxygen molecules of a fuel cell.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A fuel cell apparatus comprising:

an anode;

a cathode;

an electrolyte disposed between said anode and said cathode;

a magnetic field generator in proximity to said cathode for creating a magnetic field; and a physical thermal barrier made of a thermally insulating material disposed between said magnetic field generator and said cathode.

2. The apparatus of claim 1, further comprising an air source for supplying air to said cathode.

3. The apparatus of claim 2, wherein said magnetic field is directed to said air to increase oxygen concentration at a surface of said cathode.

4. The apparatus of claim 1, wherein said magnetic field generator is a permanent magnet.

5. The apparatus of claim 4, wherein said magnet is a high temperature magnet.

6. The apparatus of claim 5, wherein said high temperature magnet comprises $Sm_2Co_{17}$.

7. The apparatus of claim 1, wherein said magnet is an electromagnet.

8. The apparatus of claim 1, further comprising a magnetic shield housing said fuel cell apparatus.

9. The apparatus of claim 1, wherein said thermal barrier comprises an aerogel, ceramic, or polymer.

10. The apparatus of claim 1, wherein said electrolyte comprises a solid oxide membrane.

11. The apparatus of claim 1, wherein said magnet is arranged adjacent to said cathode.

12. The apparatus of claim 1, wherein said magnet is arranged about said anode and said cathode.

13. A fuel cell apparatus comprising:

an anode;

a cathode;

an electrolyte disposed between said anode and said cathode;

a single pole magnet in proximity to said cathode, wherein said cathode comprises magnetic materials so as to form a second magnetic pole and generate a magnetic field with said single pole magnet.

14. The apparatus of claim 13, wherein said magnetic materials comprise doped cobaltites, manganites, or ferrites.

15. The apparatus of claim 13, further comprising a magnetic shield disposed around said anode, cathode, electrolyte and magnet.

16. The apparatus of claim 13, wherein said magnet comprises a $Sm_2Co_{17}$ magnet.

17. A fuel cell apparatus comprising:
an anode;
a cathode;
an electrolyte disposed between said anode and said cathode;
and a coil wrapped around said cathode for creating a magnetic field.

18. The apparatus of claim 17, wherein said fuel cell apparatus is a tubular type fuel cell.

19. The apparatus of claim 17, wherein said coil carries an electric current to create said a magnetic field.

20. The apparatus of claim 19, further comprising a cathode air supply, wherein said magnetic field is directed to air at said cathode to increase the concentration of oxygen at a surface of said cathode.

21. The apparatus of claim 19, wherein said coil carries a controlled alternating current to induce an alternating magnetic field directed to a surface of said cathode for enhancing catalytic activity at said cathode surface.

22. The apparatus of claim 19, wherein said cathode is a magnetic cathode.

23. A fuel cell, said fuel cell comprising:
an anode;
a cathode;
an electrolyte disposed between said anode and said cathode;
and a magnetic field generator in proximity to said cathode for creating a magnetic field;
wherein said magnetic field generator comprises first and second magnetic field generators disposed on opposite sides of said cathode and a third magnetic field generator disposed at an end of said cathode.

24. The apparatus of claim 23, wherein said magnetic field generator comprises a $Sm_2Co_{17}$ magnet.

25. The apparatus of claim 23, further comprising a magnetic shield disposed around said anode, cathode, electrolyte and magnetic field generator.

26. The apparatus of claim 23, further comprising a thermal barrier disposed between said cathode and at least one of said magnetic field generators.

* * * * *